United States Patent
Kawamata

(10) Patent No.: US 10,140,002 B2
(45) Date of Patent: Nov. 27, 2018

(54) INFORMATION PROCESSING APPARATUS, INFORMATION PROCESSING METHOD, AND PROGRAM

(75) Inventor: Wataru Kawamata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 662 days.

(21) Appl. No.: 14/237,361

(22) PCT Filed: Aug. 21, 2012

(86) PCT No.: PCT/JP2012/005233
§ 371 (c)(1),
(2), (4) Date: Feb. 6, 2014

(87) PCT Pub. No.: WO2013/031134
PCT Pub. Date: Mar. 7, 2013

(65) Prior Publication Data
US 2014/0189581 A1    Jul. 3, 2014

(30) Foreign Application Priority Data

Sep. 1, 2011   (JP) .................................. 2011-191144

(51) Int. Cl.
*G06F 3/0481*    (2013.01)
*G06F 3/0482*    (2013.01)
(Continued)

(52) U.S. Cl.
CPC ........ *G06F 3/04845* (2013.01); *G06F 3/0488* (2013.01); *G06F 3/04883* (2013.01)

(58) Field of Classification Search
CPC .... G06F 3/0482; G06F 3/0481; G06F 3/0483; G06F 3/04817; G06F 9/4443; G06F 1/1626; H04N 5/44543
See application file for complete search history.

(56) References Cited

U.S. PATENT DOCUMENTS 5,481,710 A *  1/1996  Keane .................. G06F 9/4443
                                                          719/320
8,176,435 B1 *  5/2012  Jitkoff ................. G06F 3/04883
                                                          715/701
(Continued)

FOREIGN PATENT DOCUMENTS

CN    101410781 A    4/2009
JP    2001-290585 A   10/2001
(Continued)

OTHER PUBLICATIONS

International Search Report dated Nov. 27, 2012, in PCT/JP2012/005233.

(Continued)

*Primary Examiner* — Kevin L Young
*Assistant Examiner* — Erik V Stitt
(74) *Attorney, Agent, or Firm* — Xsensus, LLP

(57) ABSTRACT

An information processing apparatus including: a display controller that controls a user interface to display a first object; and a detection unit that detects an input received at the user interface, wherein the display controller performs a predetermined operation corresponding to the displayed first object based on a first input detected at a first position at which the first object is displayed and a second input detected at a second position in which the object is not displayed.

19 Claims, 13 Drawing Sheets

(51) Int. Cl.
*G06F 3/0483* (2013.01)
*G06F 3/0484* (2013.01)
*G06F 3/0488* (2013.01)

(56) References Cited

U.S. PATENT DOCUMENTS

| | | | | |
|---|---|---|---|---|
| 8,209,630 | B2 * | 6/2012 | Thimbleby | G06F 3/04883 345/660 |
| 8,400,477 | B1 * | 3/2013 | Young | G06F 3/04845 345/665 |
| 8,479,117 | B2 * | 7/2013 | Starr | G06F 9/4443 715/798 |
| 8,612,884 | B2 * | 12/2013 | Capela | G06F 3/04845 345/173 |
| 8,766,928 | B2 * | 7/2014 | Weeldreyer | G06F 3/0481 345/173 |
| 2002/0036618 | A1 | 3/2002 | Wakai et al. | |
| 2003/0007006 | A1 * | 1/2003 | Baar | G06F 3/0481 715/767 |
| 2006/0001650 | A1 | 1/2006 | Robbins et al. | |
| 2009/0079700 | A1 | 3/2009 | Abernathy | |
| 2009/0198767 | A1 | 8/2009 | Jakobson et al. | |
| 2011/0055773 | A1 | 3/2011 | Agarawala et al. | |
| 2011/0069018 | A1 | 3/2011 | Atkins et al. | |
| 2011/0074710 | A1 * | 3/2011 | Weeldreyer | G06F 3/0481 345/173 |
| 2011/0074828 | A1 | 3/2011 | Capela et al. | |
| 2011/0141142 | A1 * | 6/2011 | Leffert | G06F 3/04883 345/659 |
| 2011/0181527 | A1 | 7/2011 | Capela et al. | |
| 2011/0181528 | A1 | 7/2011 | Capela et al. | |
| 2012/0316782 | A1 * | 12/2012 | Sartipi | G01C 21/367 701/455 |
| 2013/0055126 | A1 * | 2/2013 | Jackson | G06F 3/04812 715/769 |
| 2013/0117711 | A1 * | 5/2013 | Hayes | G06F 9/4443 715/800 |
| 2017/0038938 | A1 * | 2/2017 | Jetha | G06F 3/0481 |

FOREIGN PATENT DOCUMENTS

| | | |
|---|---|---|
| JP | 2004-302124 A | 10/2004 |
| JP | 2007-279638 A | 10/2007 |
| JP | 2008-70968 A | 3/2008 |
| JP | 2008-209915 A | 9/2008 |
| JP | 2009-525538 A | 7/2009 |
| JP | 2009-271689 A | 11/2009 |
| JP | 2010-157070 A | 7/2010 |
| JP | 2010-176330 A | 8/2010 |
| JP | 2011-022964 A | 2/2011 |
| JP | 2011-53770 A | 3/2011 |
| WO | WO 2007/089766 A2 | 8/2007 |
| WO | WO 2008/138046 A1 | 11/2008 |
| WO | WO 2011/037796 A1 | 3/2011 |

OTHER PUBLICATIONS

Combined Office Action and Search Report dated Apr. 1, 2016 in Chinese Patent Application No. 201280040926.2 (with English language translation).

Office Action dated Apr. 19, 2016 in Japanese Patent Application No. 2011-191144.

Extended European Search Report dated Mar. 5, 2015 in Patent Application No. 12827276.2.

Japanese Office Action dated Dec. 8, 2015 in Patent Application No. 2011-191144.

Office Action dated Jul. 14, 2015 in Japanese Patent Application No. 2011-191144.

\* cited by examiner

[Fig. 1]
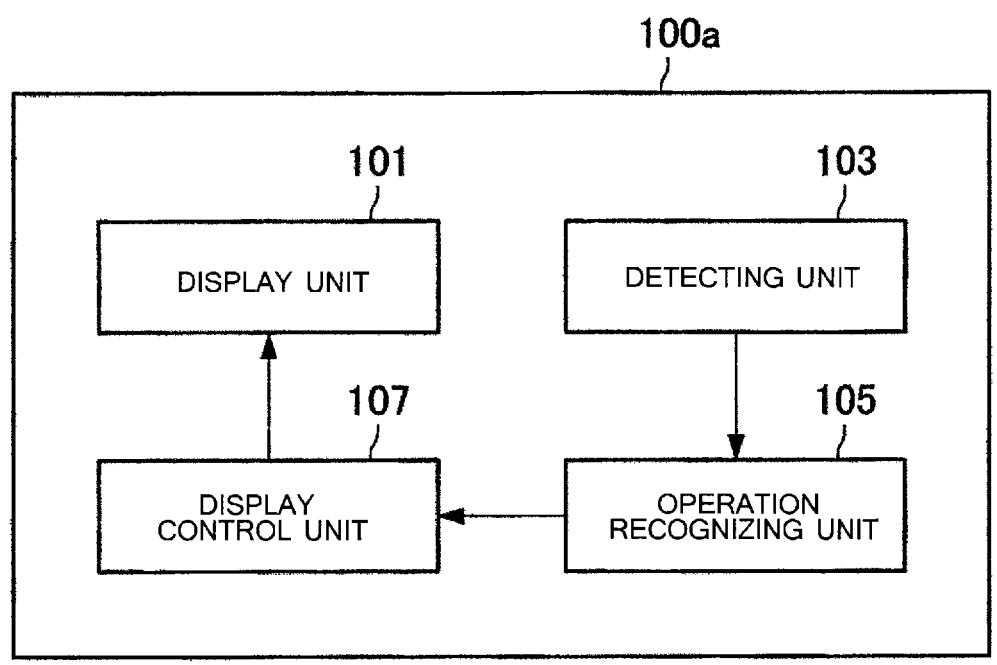

[Fig. 2]
(STATE 1)
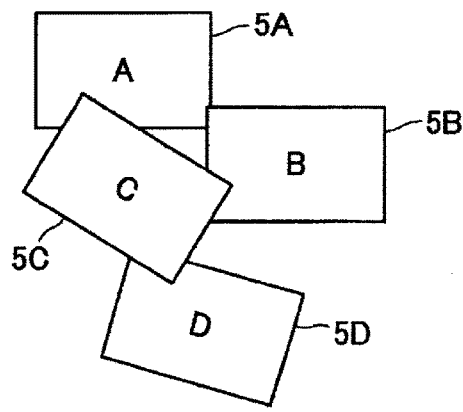
(STATE 2)
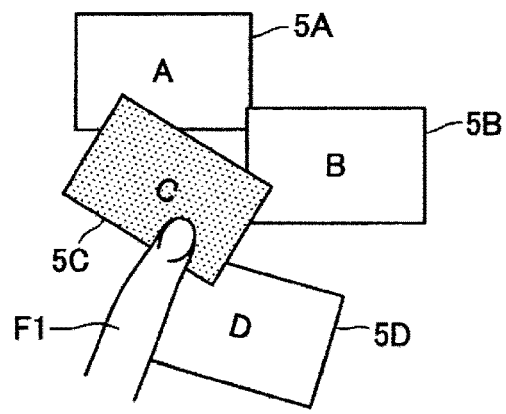
(STATE 3)
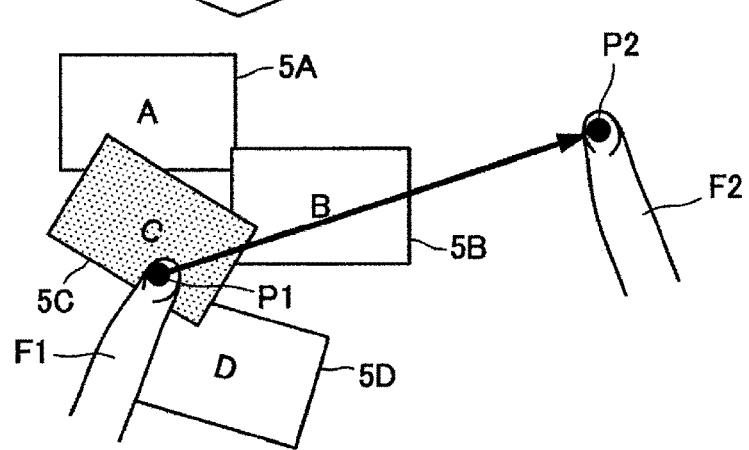

[Fig. 3]
(STATE 3)
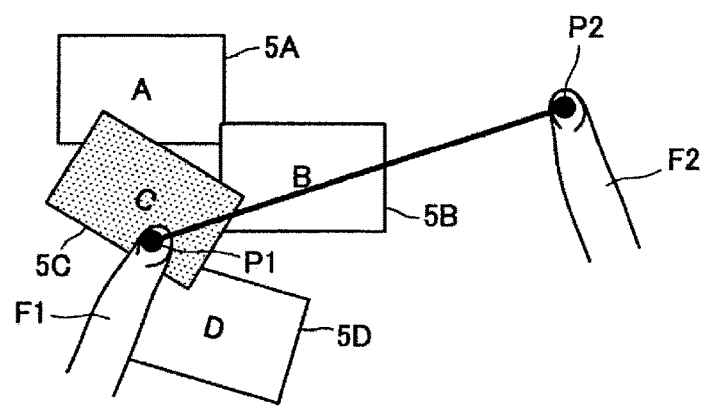
(STATE 4)
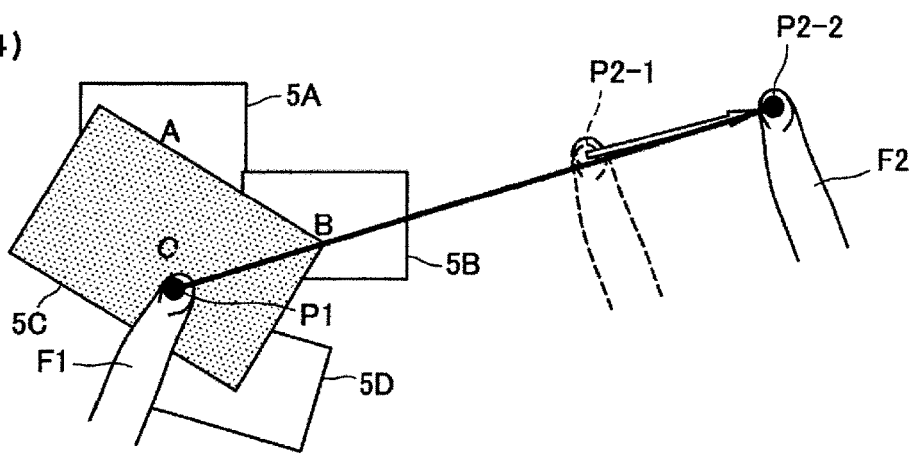

[Fig. 4]
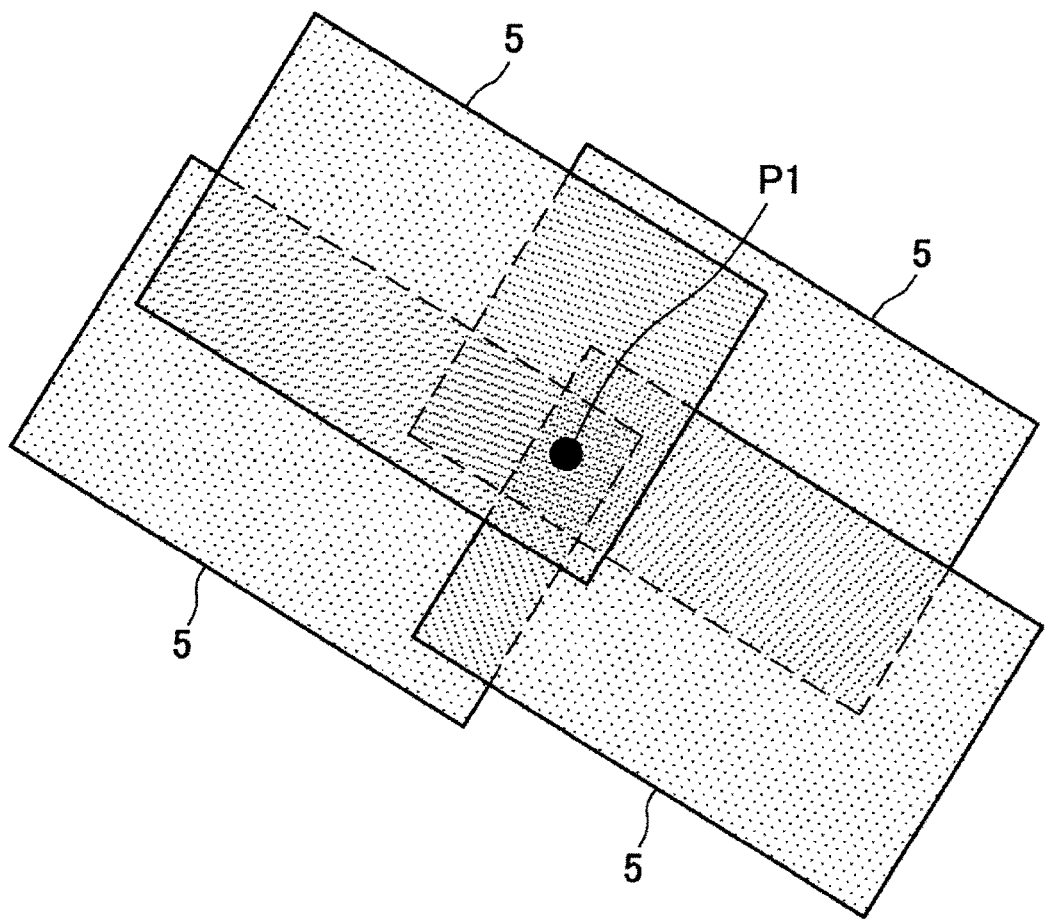

[Fig. 5]
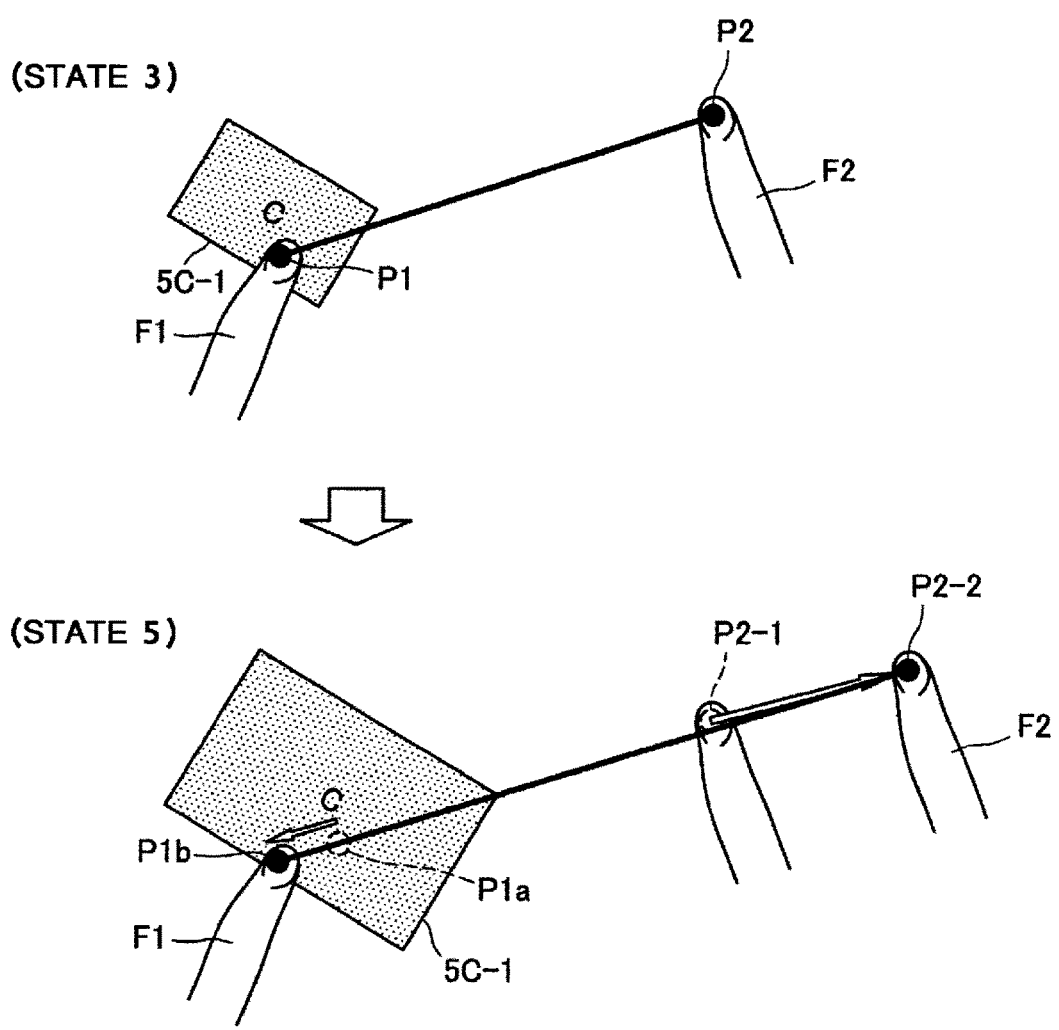

[Fig. 6]
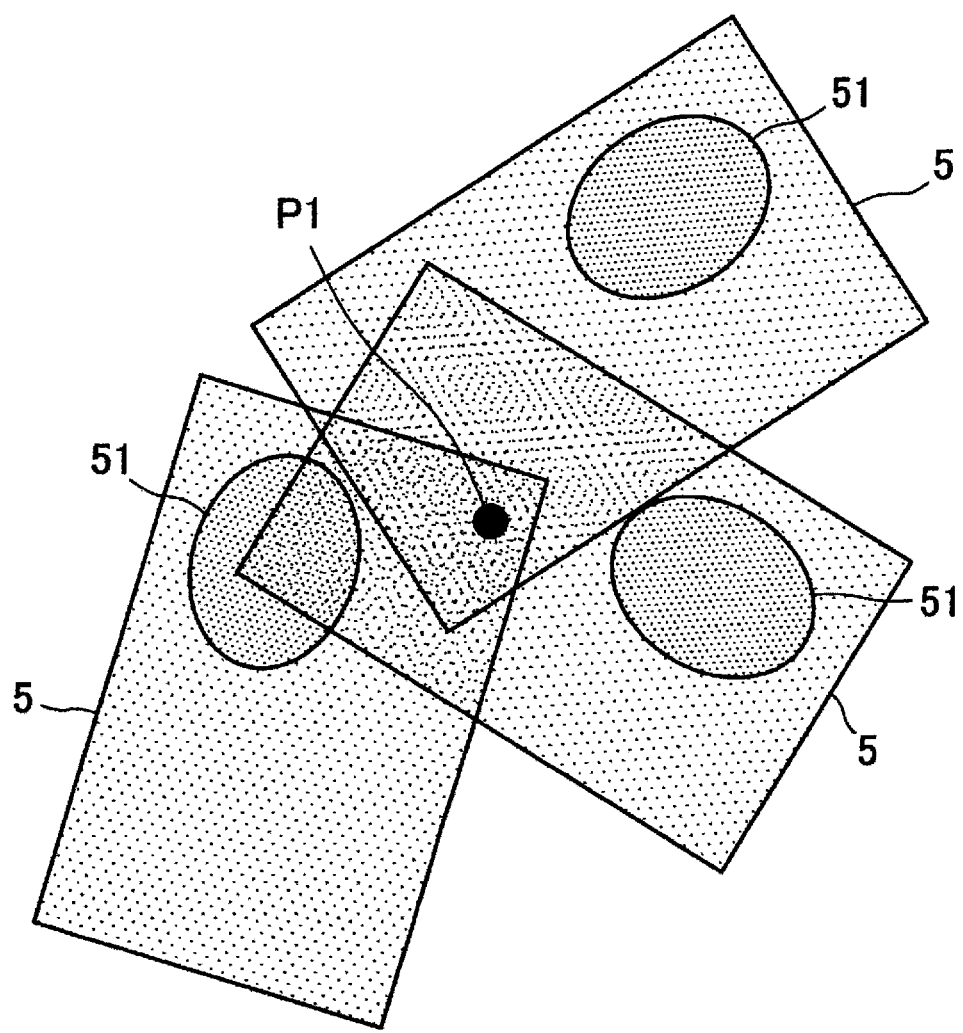

[Fig. 7]
(STATE 6)
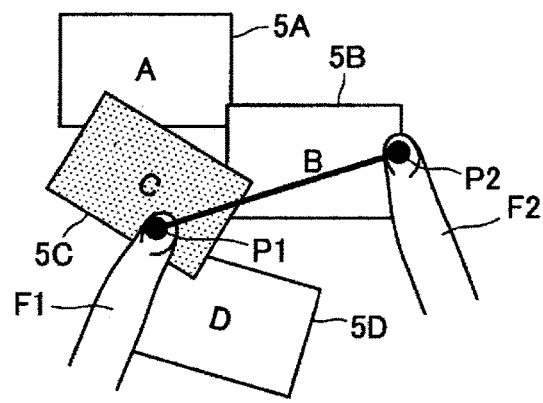
(STATE 7)
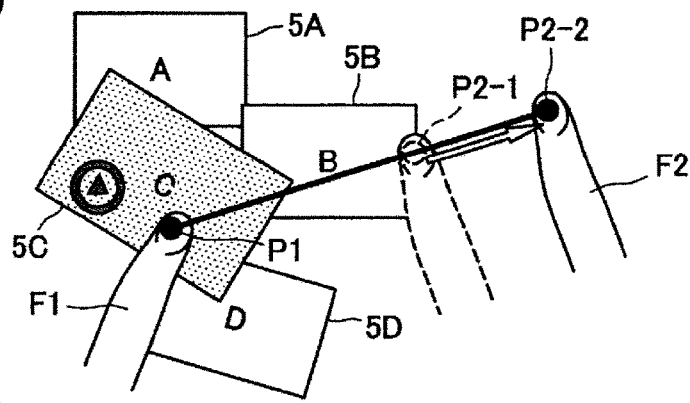
(STATE 8)
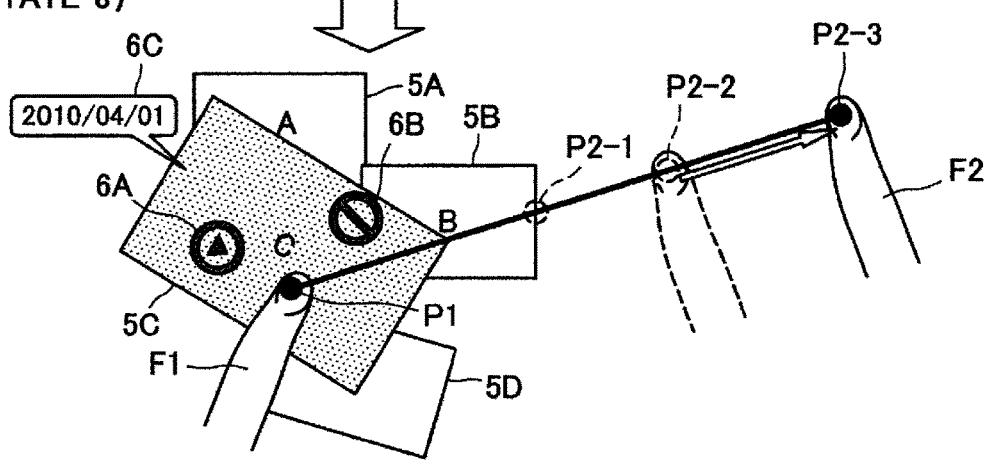

[Fig. 8]
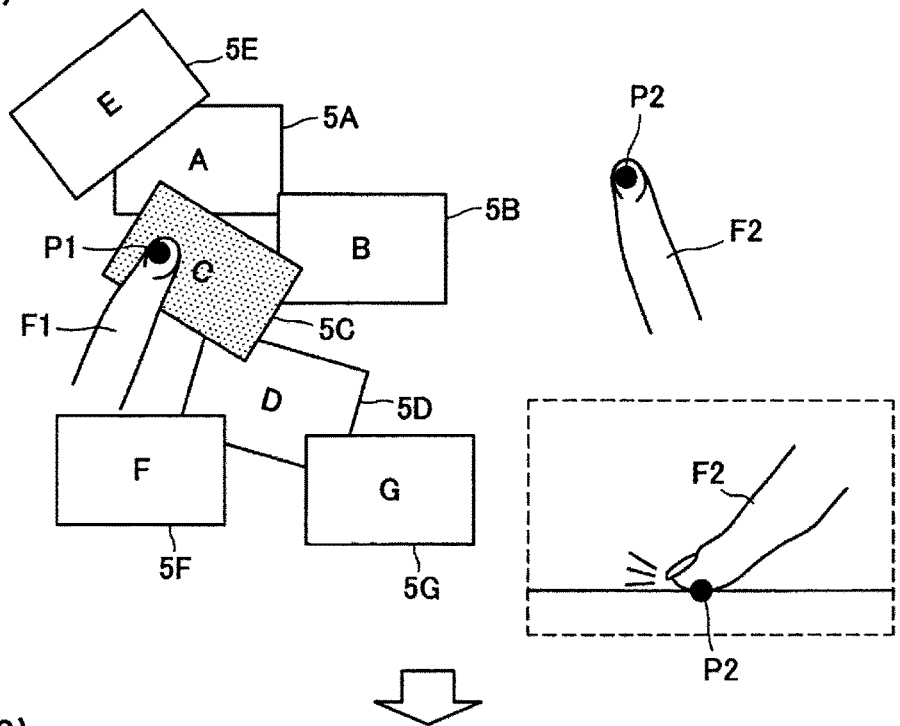
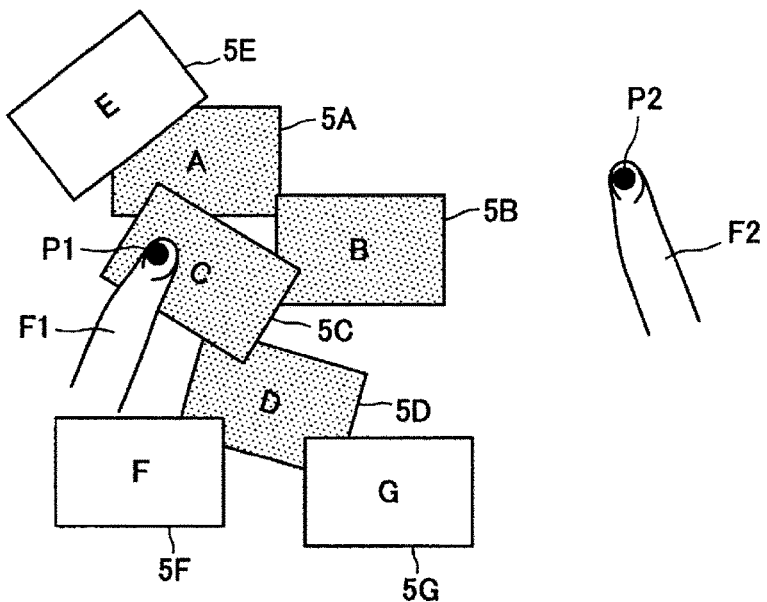

[Fig. 9]
(STATE 10)
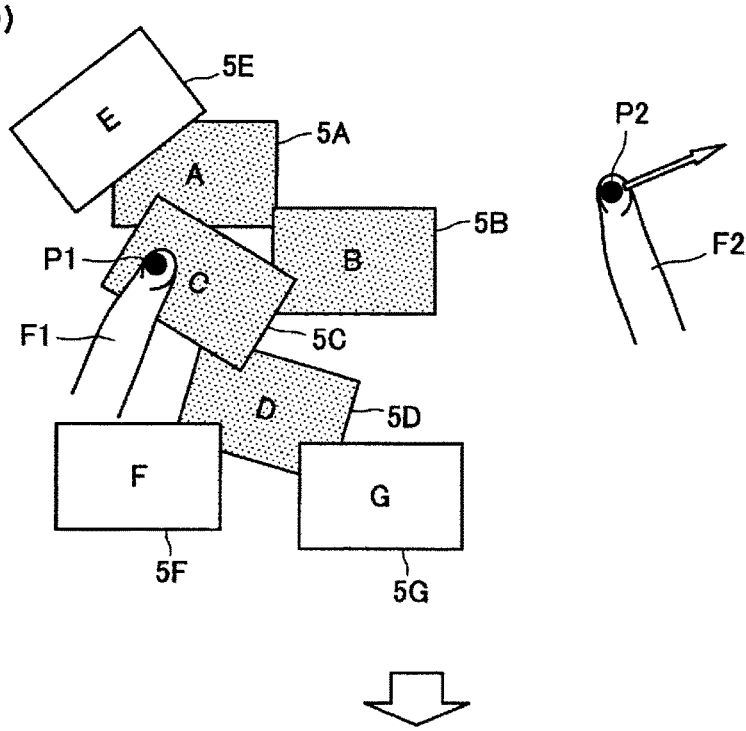
(STATE 11)
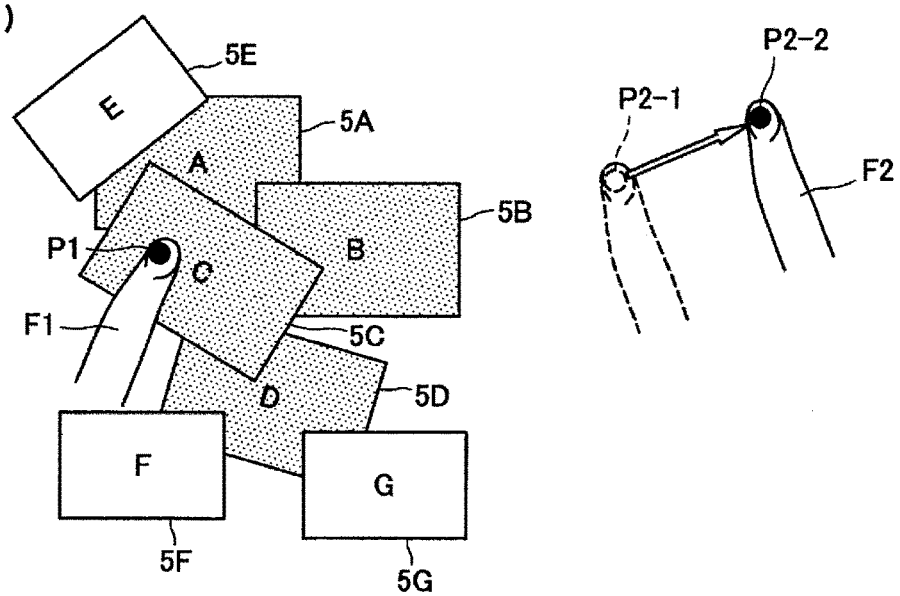

[Fig. 10]
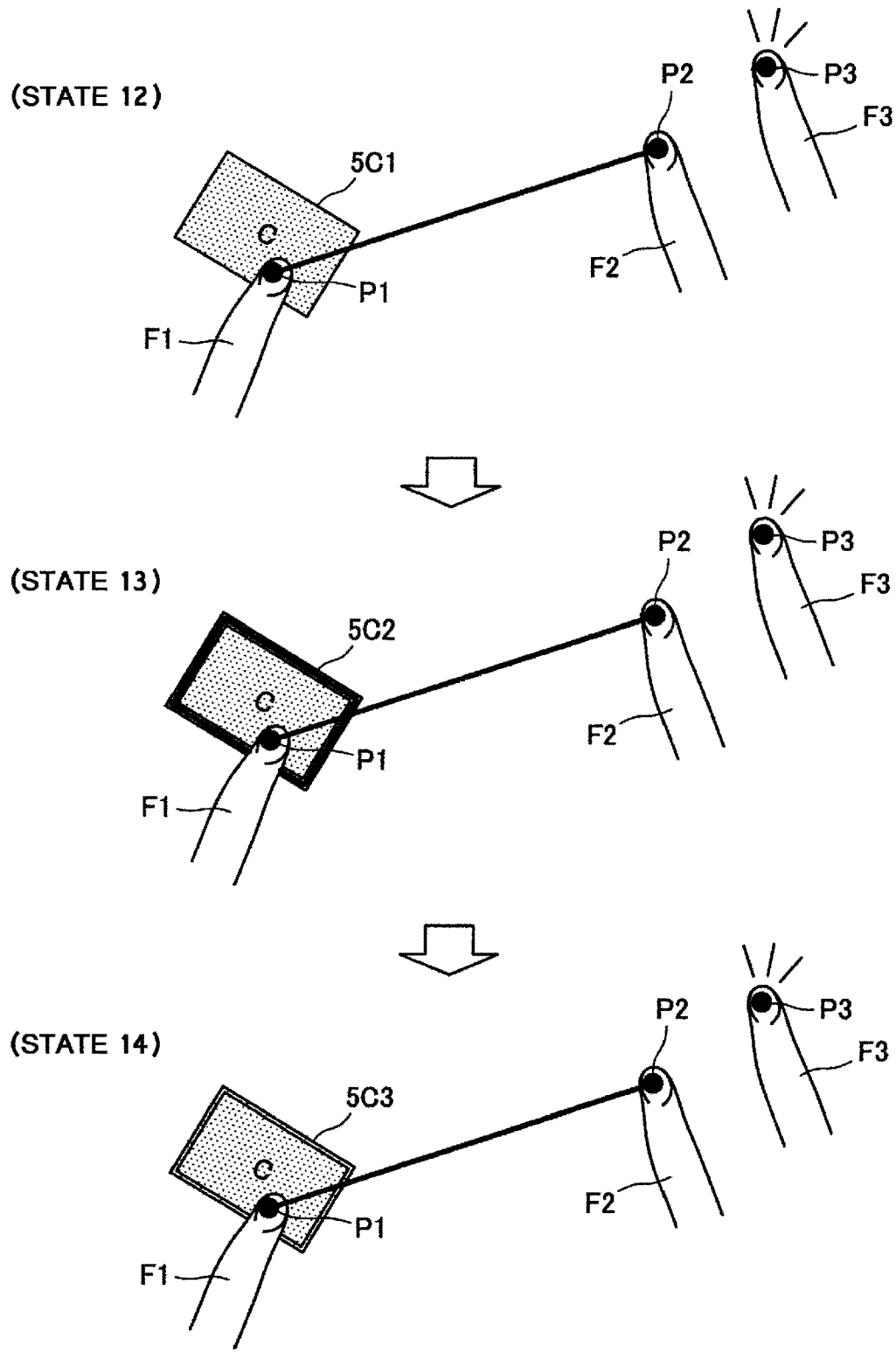

[Fig. 11]
(STATE 15)
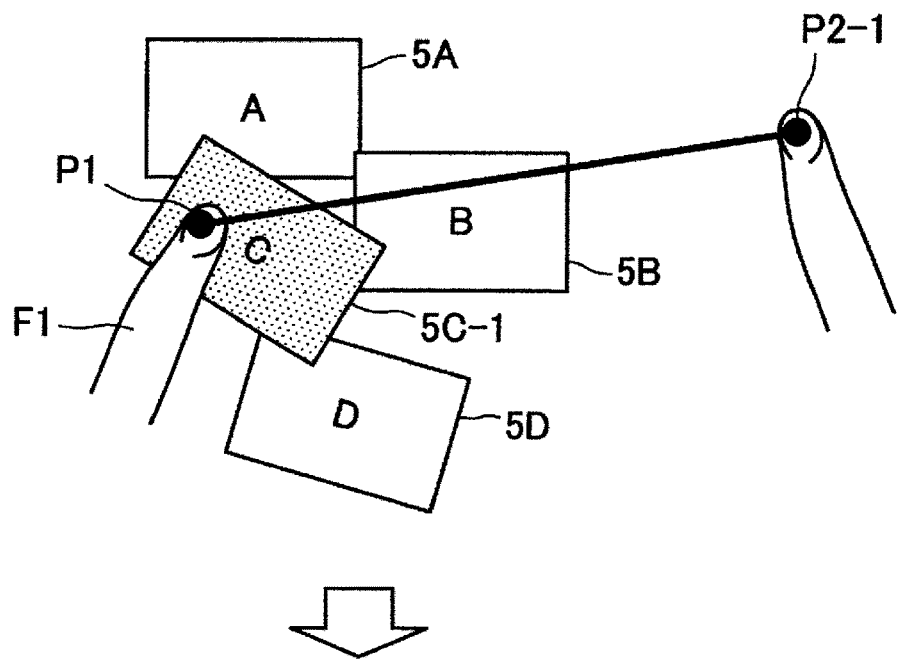
(STATE 16)
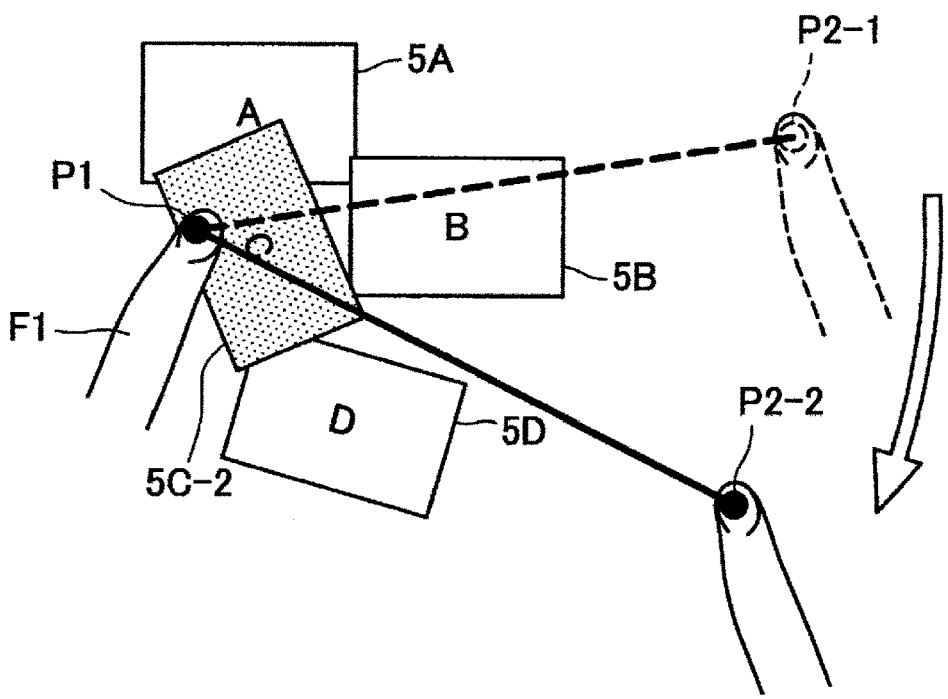

[Fig. 12]
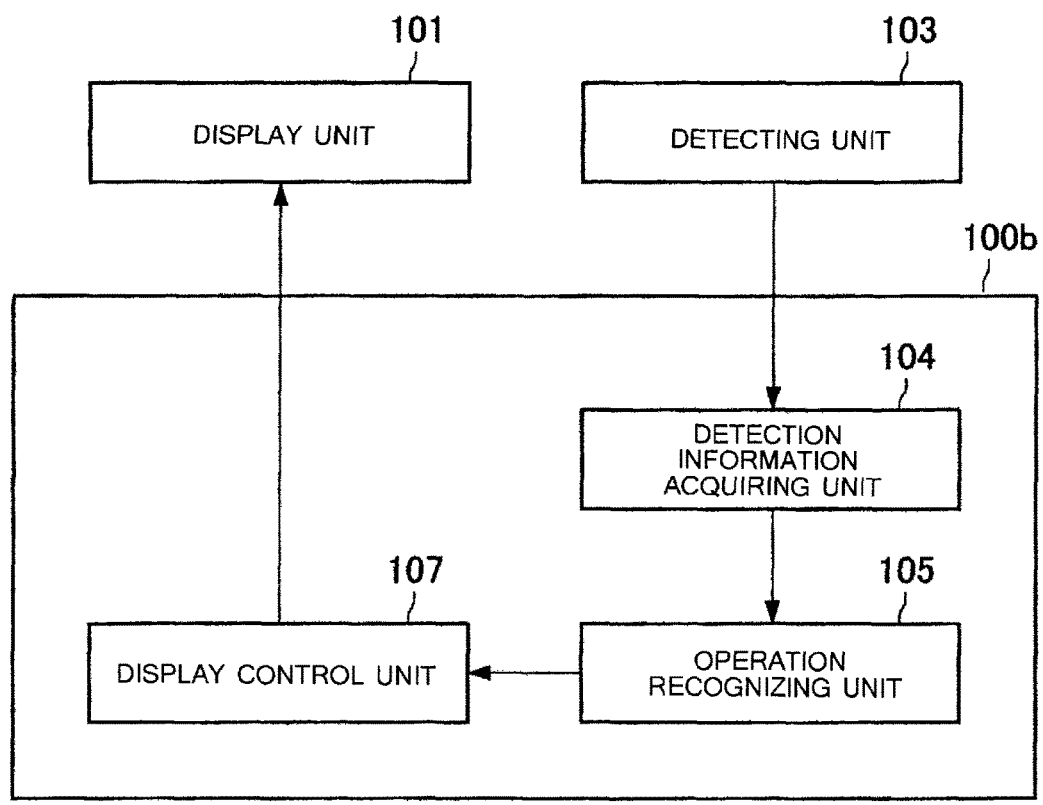

[Fig. 13]
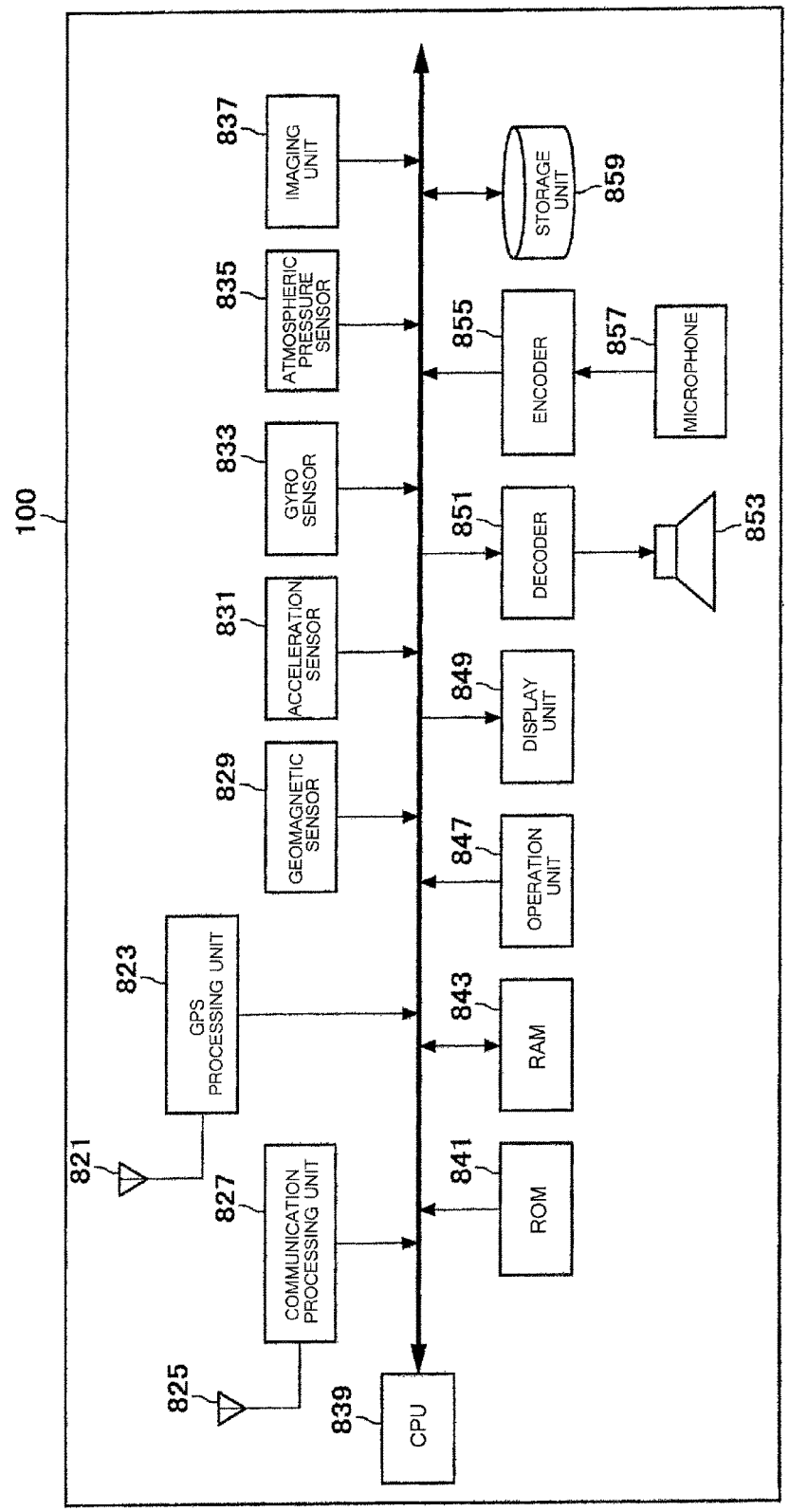

INFORMATION PROCESSING APPARATUS, INFORMATION PROCESSING METHOD, AND PROGRAM

TECHNICAL FIELD

The present disclosure relates to an information processing apparatus, an information processing method, and a program.

BACKGROUND ART

In recent years, input devices have been diversified, and thus many methods of operating information processing apparatuses by users have been contrived. For example, in pointing devices, the number of coordinate positions simultaneously input has been one in the related art. For example, as disclosed in Patent Document 1, however, multi-pointing devices capable of simultaneously inputting a plurality of coordinate positions have appeared.

CITATION LIST

Patent Literature

PTL 1: Patent Document 1: Japanese Patent Application Laid-Open No. 2008-70968

SUMMARY

Technical Problem

Thus, user interfaces improved in operability have been demanded, as input devices have been diversified. Thus, it is desirable to provide a novel and improved information processing apparatus, information processing method, and program capable of improving operability.

Solution to Problem

According to the present disclosure, there is provided an information processing apparatus including: a display controller that controls a user interface to display a first object; and a detection unit that detects an input received at the user interface, wherein the display controller performs a predetermined operation corresponding to the displayed first object based on a first input detected at a first position at which the first object is displayed and a second input detected at a second position in which the object is not displayed.

According to the present disclosure, there is provided an information processing method including: controlling a user interface to display a first object;
detecting an input received at the user interface; and performing a predetermined operation corresponding to the displayed first object based on a first input detected at a first position at which the first object is displayed and a second input detected at a second position in which the object is not displayed.

According to the present disclosure, there is provided a non-transitory computer-readable medium including computer program instructions, which when executed by an information processing apparatus, cause the information processing apparatus to perform a method comprising: controlling a user interface to display a first object; detecting an input received at the user interface; and performing a predetermined operation corresponding to the displayed first object based on a first input detected at a first position at which the first object is displayed and a second input detected at a second position in which the object is not displayed.

Advantageous Effects of Invention

According to the present disclosure described above, the operability can be improved.

BRIEF DESCRIPTION OF DRAWINGS

FIG. 1 is a block diagram illustrating the functional configuration of an information processing apparatus according to a first embodiment of the present disclosure.

FIG. 2 is a diagram illustrating an object selecting operation recognized in the information processing apparatus according to the first embodiment.

FIG. 3 is a diagram illustrating a target object expanding operation in the information processing apparatus according to the first embodiment.

FIG. 4 is a diagram illustrating a display position of a target object displayed by the information processing apparatus according to the first embodiment.

FIG. 5 is a diagram illustrating movement of an expansion center of the target object displayed by the information processing apparatus according to the first embodiment.

FIG. 6 is a diagram illustrating a display position of the target object displayed by the information processing apparatus according to the first embodiment, when an important region is included.

FIG. 7 is a diagram illustrating display of an additional function in the expanding operation in the information processing apparatus according to the first embodiment.

FIG. 8 is a diagram illustrating an operation of expanding a selection range of a target object in the information processing apparatus according to the first embodiment.

FIG. 9 is a diagram illustrating an expanding operation when a plurality of target objects is selected in the information processing apparatus according to the first embodiment.

FIG. 10 is a diagram illustrating an operation of changing an effect of an object in the information processing apparatus according to the first embodiment.

FIG. 11 is a diagram illustrating an operation of rotating a target object in the information processing apparatus according to the first embodiment.

FIG. 12 is a block diagram illustrating the functional configuration of an information processing apparatus according to a second embodiment of the present disclosure.

FIG. 13 is a block diagram illustrating an example of a hardware configuration of the information processing apparatus according to the first and second embodiments of the present disclosure.

DESCRIPTION OF EMBODIMENTS

Preferred embodiments of the present disclosure will be described in detail with reference to the accompanying drawings. Throughout the specification and the drawings, the same reference numerals are given to constituent elements having substantially the same functional configuration and the description thereof will not be repeated.

In the specification and the drawings, different alphabets are sometimes given to the end of the same reference numeral to distinguish a plurality of constituent elements having substantially the same functional configuration from each other. For example, a plurality of constituent elements having substantially the same functional configuration are distinguished as objects 5A and 5B, as necessary. However, when it is not necessary to distinguish the plurality of constituent elements having substantially the same functional configuration from each other, only the same reference numeral is given to the constituent elements. For example, when it is not necessary to distinguish the objects 5A and 5B from each other, the objects 5A and 5B are simply referred to as the objects 5.

In the specification and the drawings, different reference numerals are sometimes given to the end of the same reference numeral by inserting a hyphen therebetween to distinguish a plurality of constituent elements having substantially the same functional configuration from each other. For example, a plurality of constituent elements having substantially the same functional configuration are distinguished as objects 5C-1 and 5C-2, as necessary. However, when it is not necessary to distinguish the plurality of constituent elements having substantially the same functional configuration from each other, only the same reference numeral is given to the constituent elements. For example, when it is not necessary to distinguish the objects 5C-1 and 5C-2 from each other, the objects 5C-1 and 5C-2 are simply referred to as the objects 5C-2.

The description will be made in the following order.
1. First Embodiment
1-1. Functional Configuration
1-2: Expanding Operation
1-3: Movement of Display Position
1-4: Display of Additional Function
1-5: Operation of Expanding Selection Range
1-6: Operation of Changing Effect
1-7: Rotating Operation
2. Second Embodiment
3. Example of Hardware Configuration
<1. First Embodiment>
(1-1. Functional Configuration)

First, the functional configuration of an information processing apparatus according to an embodiment of the present disclosure will be described with reference to FIG. 1. FIG. 1 is a block diagram illustrating the functional configuration of the information processing apparatus according to the embodiment of the disclosure.

An information processing apparatus 100a illustrated in FIG. 1 is an apparatus that is capable of recognizing a plurality of coordinate positions simultaneously input. Examples of the information processing apparatus 100a include a portable telephone, a personal computer (PC), a video processing apparatus, a game console, a home appliance, and a music reproducing apparatus.

The information processing apparatus 100a includes a display unit 101, a detecting unit 103, an operation recognizing unit 105, and a display control unit 107.

(Display Unit 101)

The display unit 101 has a function of providing a display screen to a user. The display unit 101 may be a display device such as a liquid crystal display (LCD) device or an organic light emitting diode (OLED) display device.

(Detecting Unit 103)

The detecting unit 103 has a function of detecting the position of an operation body on a display screen. The detecting unit 103 can detect the positions of a plurality of fingers F on the display screen. The function of the detecting unit 103 is realized using, for example, a touch sensor, an imaging apparatus, or other sensors. Examples of the operation body include a user's body such as a finger, an arm, or a foot and a stylus pen. In this embodiment, it is assumed that the detecting unit 103 is a touch sensor superimposed on the display unit 101 and the operation body is a finger F of a user. The touch sensor used here may be, for example, a contact type touch sensor that detects the position of the finger F touching the display screen. Alternatively, the touch sensor used here may be a non-contact type touch sensor that detects the position of the finger F on the display screen in a non-contact manner. Alternatively, the touch sensor used here may detect a pushing operation of a user on the display screen.

(Operation Recognizing Unit 105)

The operation recognizing unit 105 has a function of recognizing a process indicated by an operation pattern input by the user. The operation pattern is determined based on the position of the operation body. Specifically, the operation pattern is determined based on various conditions such as a detection timing of the position of the operation body and a change pattern of the position of the operation body. The operation recognizing unit 105 determines the operation pattern to recognize a process associated with the operation pattern in advance.

(Display Control Unit 107)

The display control unit 107 has a function of controlling display of a display screen on the display unit 101. The display control unit 107 can generate the display screen based on the process recognized by the operation recognizing unit 105 and display the display screen on the display unit 101. For example, the display control unit 107 can display a display screen on which a target object is expanded, when the operation recognizing unit 105 recognizes that an operation pattern input by the user is an object expanding operation.

The display control unit 107 can display an object on the display screen. For example, the display control unit 107 may display a plurality of objects on the display screen at random. When one of the objects is selected, the display control unit 107 may display the selected object (hereinafter, referred to as a target object meaning an object to be operated) differently from another object. The details of control performed by the display control unit 107 will be described in accordance with each situation described below.

Examples of the function of the information processing apparatus 100a according to this embodiment have hitherto been described. The constituent elements may be configured using general units or circuits or may be configured by hardware specialized for the functions of the constituent elements. Further, the functions of the constituent elements may be performed by reading a control program, which describes a processing order in which the functions are realized by an arithmetic device such as a central processing unit (CPU), from a storage medium such as a read-only memory (ROM) or a random access memory (RAM), which stores the control program, analyzing the control program, and executing the control program. Accordingly, a configuration to be used may be appropriately modified in accordance with a technical level at which this embodiment is realized.

A computer program configured to realize the functions of the information processing apparatus 100a according to the above-described embodiment may be created and mounted on a personal computer or the like. Further, a computer readable recording medium that stores the computer program may be provided. Examples of the recording medium include a magnetic disk, an optical disc, a magneto-optical disc, and a flash memory. Furthermore, the computer program may be delivered via a network or the like without use of a recording medium.

(1-2. Expanding Operation)

Next, an expanding operation of the information processing apparatus according to this embodiment will be described with reference to FIGS. 2 and 3. FIG. 2 is a diagram illustrating an object selecting operation recognized in the information processing apparatus according to the first embodiment. FIG. 3 is a diagram illustrating a target object expanding operation in the information processing apparatus according to the first embodiment.

First, the display control unit 107 can display a plurality of objects 5 arranged at random on the display screen, as illustrated in (state 1). Here, four objects 5 are illustrated, that is, an object 5A, an object 5B, an object 5C, and an object 5D are illustrated. In this state, the user selects a target object to be operated from among the objects 5 with the finger F1 (state 2). Here, the finger F1 is an example of a first operation body. For example, when the position of the finger F1 is detected on one of the objects 5, the operation recognizing unit 105 can recognize a first operation of selecting the target object to be operated from among the objects 5. More specifically, when the position of the finger F1 is detected, the operation recognizing unit 105 can recognize the first operation of selecting the object 5C located under the finger F1. The display control unit 107 may display the selected object 5C differently from the other objects 5. When another object 5 is displayed while being overlapped on the selected object 5C, the display control unit 107 may perform control such that the selected object 5C is displayed at the uppermost portion.

Thus, when the target object 5C is selected, one position on the display screen is pointed with a finger F2 (state 3). The finger F2 is an example of a second operation body. The finger F2 may be another finger of the same hand as that of the finger F1. Alternatively, the finger F2 may be one of the fingers of another hand of the same user. Alternatively, the finger F2 may be a finger of another user. The operation recognizing unit 105 can recognize a second operation on the target object 5C based on a change in relative positions between a position P1 of the finger F1 and a position P2 of the finger F2.

Hereinafter, an expanding operation as an example of the second operation will be described with reference to FIG. 3. The position of the finger F2 in state 3 is assumed to be P2-1. The user moves the finger F2 from the position P2-1 to a position P2-2, as illustrated in state 4. Here, when the distance between the position P1 and the position P2-2 and the distance between the position P1 and the position P2-2 are changed, the operation recognizing unit 105 can recognize that the second operation is an operation of changing the size of the selected object 5. More specifically, when the distance between the position P1 and the position P2-2 is broader than the distance between the position P1 and the position P2-2, the operation recognizing unit 105 can recognize that the second operation is an expanding operation. Conversely, when the distance between the position P1 and the position P2-2 is narrower than the distance between the position P1 and the position P2-2, the operation recognizing unit 105 can recognize that the second operation is a reducing operation. In state 4, when the operation recognizing unit 105 recognizes that the second operation is an expanding operation, the display control unit 107 expands and displays the target object 5C.

As described above, when the user desires to perform an operation (the second operation) on one of a plurality of objects on a display screen provided by the information processing apparatus 100a, the user can selectively perform the second operation on the selected object 5 by performing a selecting operation (the first operation) with the finger F1, and then performing the second operation. Patent Document 1 described above discloses a technique of performing an expanding or reducing process based on a relative distance between two simultaneously detected points (so-called pinch-in and pinch-out). However, when a target object is specified with two fingers, the specifying accuracy of the target object may deteriorate compared to a case where a target object is specified with a single finger. Accordingly, the information processing apparatus 100a is configured such that a target object is specified with high accuracy, and then the second operation can be performed on the selected object. In particular, as illustrated in FIG. 2, the configuration of the information processing apparatus 100a is effective when the plurality of objects 5 to be operated is displayed.

Although not illustrated here, when the target object 5C is selected as a target object with the finger F1 and then the position of the finger F1 is then changed, the display control unit 107 can trace the changed position of the finger F1 to move the target object 5C (third operation). The third operation may be performed before or after the second operation or may be performed simultaneously with the second operation.

(1-3. Movement of Display Position)

Hereinafter, movement of the display position of a target object will be described with reference to FIGS. 4 to 6. FIG. 4 is a diagram illustrating the display position of a target object displayed by the information processing apparatus according to this embodiment. FIG. 5 is a diagram illustrating movement of an expansion center of the target object displayed by the information processing apparatus according to this embodiment. FIG. 6 is a diagram illustrating a display position of the target object displayed by the information processing apparatus according to this embodiment, when an important region is included.

As described above, the information processing apparatus 100a selects the object 5 with the finger F1, and then performs the second operation, putting the finger F1 on the selected object 5. Then, when the user performs the second operation, the user may rarely view the object in some situations. Accordingly, the display control unit 107 of the information processing apparatus 100a may move the display position of the target object 5 to a position at which the user can easily view the target object. As illustrated in FIG. 4, the display control unit 107 may move the display position of the selected object 5 within a range in which the position P1 of the finger F1 is not out of the selected object 5.

Further, the display control unit 107 can move the display position of the selected object 5 in accordance with a positional relation between the position P1 of the finger F1 and the position P2 of the finger F2. In FIG. 3, the case in which the central point of the object 5C is an expansion center has been described. However, the present technology is not limited thereto. For example, when the second operation is an expanding operation, the display control unit 107 may control display such that the object 5C is expanded in the direction of the finger F2, as illustrated in FIG. 5. At this time, the expansion center is moved in the opposite direction of the finger F2 within the range in which the position P1 of the finger F1 is not out of the object 5C. Accordingly, the target object 5C is not covered by the finger F1 and the second operation can be performed while ensuring easiness of view.

The movement of the display position may be performed simultaneously with, for example, the second operation. Alternatively, the movement of the display position may be performed after the position P2 of the finger F2 is detected. In particular, when the object 5 is an image, the user may sometimes perform an operation while viewing the display of the object 5. In this case, this configuration is effective.

When the object 5 is an image, for example, as illustrated in FIG. 6, a predetermined region 51 (for example, an important region) is included within the object 5 in some cases. The predetermined region 51 may be a region corresponding to, for example, the face of a subject. Alternatively, the predetermined region 51 may be, for example, a part of an object. The predetermined region may be, for example, a region that is set based on an image analysis result of the object 5 which is an image object. The display control unit 107 can change the display position of the target object in accordance with the predetermined region included within the target object and an operation detection position, which is a position on the display screen determined and roughened in accordance with the position of the first operation body. For example, when it is detected that the first operation position is included within the predetermined region of the target object, the display control unit 107 may change the display position of the target object so that the operation detection position is not included within the predetermined region. The display control unit 107 can move the display position of the object 5 so that the predetermined region 51 does not overlap the position P1 of the finger F1, when moving the display position. With such a configuration, it is possible to prevent a situation where the predetermined region 51 is poorly viewed particularly in the object 5.

(1-4. Display of Additional Function)

Next, display of an additional function in the expanding operation of the information processing apparatus according to this embodiment will be described with reference to FIG. 7. FIG. 7 is a diagram illustrating the display of the additional function in the expanding operation of the information processing apparatus according to this embodiment.

When the second operation is a size changing operation of changing the size of the selected object 5, the display control unit 107 can display an additional function object 6 for the target object 5 on the display screen in accordance with the size of the selected target object 5.

For example, as illustrated in FIG. 7, the position P1 of the finger F1 and the position P2 of the finger F2 are detected on the display screen on which the plurality of objects 5 is displayed (state 6). State 6 is a state where the position P1 of the finger F1 and the position P2 of the finger F2 are detected, as in state 3, but the position of the finger F2 is different. As illustrated in this state, the position of the finger F2 may be a portion in which the object 5 is not displayed or may be a position on the object 5. When the user performs the expanding operation, as in state 7, the display control unit 107 displays the additional function object 6A in accordance with the size of the expanded target object 5C.

When the user further performs the expanding operation, as in state 8, yet other additional function objects 6B and 6C are displayed. The additional function objects 6 displayed here are objects used to perform an additional function of performing an adding process on the target object. For example, when the detecting unit 103 detects the position of the finger F on the additional function object 6A, the operation recognizing unit 105 can recognize a reproducing operation of reproducing the target object 5C. Further, when the detecting unit 103 detects the position of the finger F on the additional function object 6B, the operation recognizing unit 105 can recognize a deleting operation of deleting the target object 5C. The additional function object 6C may show a photographing date of the target object 5C.

(1-5. Operation of Expanding Selection Range)

Next, an expanding operation of expanding a selection range of a target object in the information processing apparatus according to this embodiment will be described with reference to FIGS. 8 and 9. FIG. 8 is a diagram illustrating an expanding operation of expanding the selection range of a target object in the information processing apparatus according to this embodiment. FIG. 9 is a diagram illustrating an expanding operation when a plurality of target objects is selected in the information processing apparatus according to this embodiment.

In state 9, the display control unit 107 displays seven objects 5, that is, displays objects 5A to 5G. Here, the object 5C is selected with the finger F1. In this state, a tapping operation is performed with the finger F2. Then, as illustrated in state 10, the selection range of the target object is expanded. Here, the operation recognizing unit 105 can recognize the tapping operation performed with the finger F2 as an operation of expanding the selection range up to the objects 5 (the objects 5A, 5B, and 5D) adjacent to the object 5C selected in state 9. The expanding operation of expanding the selection range is not limited to the expansion to the objects 5 adjacent to the previously selected object 5. For example, the selection range may be expanded up to the plurality of objects 5 displayed within a predetermined distance from the position P1 of the finger F1.

When the plurality of objects 5 is selected as the target objects through the expanding operation of expanding the selection range and the user performs an expanding operation by moving the position P2 of the finger F2, as illustrated in FIG. 9, the operation recognizing unit 105 can recognize the expanding operation as an expanding operation of expanding the plurality of objects 5 (the objects 5A to 5D) selected as the target objects. At this time, the display control unit 107 can expand and display the objects 5A to 5D. For example, at this time, the gravity center of the plurality of objects 5 can be set as the expansion center.

The expanding operation of expanding the selection range has been performed as the tapping operation with the finger F2, but the example of the present technology is not limited thereto. For example, the expanding operation of expanding the selection range may be performed with a finger F different from the finger F2. Further, the expanding operation of expanding the selection range may be a double-tapping operation. Furthermore, the expanding operation of expanding the selection range may be a tapping operation performed with a plurality of fingers.

(1-6. Operation of Changing Effect)

Next, an operation of changing an effect of a target object in the information processing apparatus according to this embodiment will be described with reference to FIG. 10. FIG. 10 is a diagram illustrating an operation of changing an effect of an object in the information processing apparatus according to this embodiment.

When the object 5 displayed on the display screen is an image object, the operation recognizing unit 105 may recognize an operation of changing an effect of the object 5. For example, the operation recognizing unit 105 may recognize a tapping operation performed with a finger F3 different from the fingers F1 and F2 as an effect changing operation. For example, the display control unit 107 may change an effect of the object 5C, when the tapping operation performed with the finger F3 is recognized. For example, a case in which the change in an effect is a change in the frame of the object 5C will be described below. In state 12, the object 5C is selected as the target object at the position P1 of the finger F1. Here, when the position P2 of the finger F2 is detected and the user performs a tapping operation with the finger F3, an object 5C2 whose frame overlaps the frame of an object 5C1 is displayed (state 13). Here, when the user performs a tapping operation with the finger F3 again, an object 5C3 whose frame, which is different from the frame of the object 5C2, overlaps the object 5C1 is displayed.

The change of the frame has hitherto been described, but the present technology is not limited thereto. For example, the change in an effect may be a change in color tone of an image (monochrome, sepia, etc.), a change in a background, a change in the direction of light, a change in an overlap state among the objects 5, a change in contrast, or the like.

(1-7. Rotating Operation)

Next, an operation of rotating a target object in the information processing apparatus according to this embodiment will be described with reference to FIG. 11. FIG. 11 is a diagram illustrating an operation of rotating a target object in the information processing apparatus according to this embodiment.

The case in which the second operation is the operation of changing the size of the target object has hitherto been described. However, the second operation may be the operation of rotating the target object. When the operation recognizing unit 105 recognizes a change in the relative positions between the positions P1 and P2 in which the distance between the position P1 of the finger F1 and the position P2 of the finger F2 is nearly constant, the display control unit 107 can rotate the target object 5C selected with the finger F1 at a display angle.

For example, as illustrated in FIG. 11, the object 5C selected with the finger F1 may be rotated clockwise from the state of an object 5C-1 to the state of an object 5C-2, while rotating the position P2 of the finger F2 from a position P2-1 to a position P2-2 about the position P1 of the finger F1 (state 16).

<2. Second Embodiment>

Next, the functional configuration of an information processing apparatus according to a second embodiment of the present disclosure will be described with reference to FIG. 12. FIG. 12 is a block diagram illustrating the functional configuration of the information processing apparatus according to the second embodiment of the present disclosure.

An information processing apparatus 100b according to the second embodiment of the present disclosure includes a detection information acquiring unit 104, an operation recognizing unit 105, and a display control unit 107 as the main units. Compared to the information processing apparatus 100a according to the first embodiment of the present disclosure, the information processing apparatus 100b is different from the information processing apparatus 100a in that the information processing apparatus 100b does not include the display unit 101 and the detecting unit 103. Therefore, the information processing apparatus 100b includes the detection information acquiring unit 104 that acquires detection information from an external detecting unit 103. Only differences between the information processing apparatus 100a according to the first embodiment and the information processing apparatus 100b will be described below and the description of the common constituent elements will not be repeated here.

(Detection Information Acquiring Unit 104)

The detection information acquiring unit 104 has a function of acquiring detection information generated when the detecting unit 103 detects the position of an operation body. The detection information acquiring unit 104 can input the acquired detection information into the operation recognizing unit 105.

<3. Example of Hardware Configuration>

Next, an example of a hardware configuration of the information processing apparatus according to the first and second embodiments of the present disclosure will be described with reference to FIG. 13. FIG. 17 is a block diagram illustrating an example of the hardware configuration of the information processing apparatus according to the first and second embodiments of the present disclosure.

For example, the information processing apparatus 100 includes a GPS antenna 821, a GPS processing unit 823, a communication antenna 825, a communication processing unit 827, a geomagnetic sensor 829, an acceleration sensor 831, a gyro sensor 833, an atmospheric pressure sensor 835, an imaging unit 837, a central processing unit (CPU) 839, a read-only memory (ROM) 841, a random access memory (RAM) 843, an operation unit 847, a display unit 849, a decoder 851, a speaker 853, an encoder 855, a microphone 857, and a storage unit 859.

(GPS Antenna 821)

The GPS antenna 821 is an example of an antenna that receives signals from positioning satellites. The GPS antenna 821 can receive GPS signals from a plurality of GPS satellites and input the received GPS signal into the GPS processing unit 823.

(GPS Processing Unit 823)

The GPS processing unit 823 is an example of a calculating unit that calculates position information based on the signals received from the positioning satellites. The GPS processing unit 823 calculates the current position information based on the plurality of GPS signals input from the GPS antenna 821 and outputs the calculated position information. Specifically, the GPS processing unit 823 calculates the position of each GPS satellite based on trajectory data of the GPS satellite and calculates the distance between each GPS satellite and the terminal apparatus 100 based on a difference between transmission and reception times of the GPS signal. Then, the current three-dimensional position can be calculated based on the calculated position of each GPS satellite and the distance between each GPS satellite and the terminal apparatus 100. Further, the trajectory data of the GPS satellite used here may be included in, for example, the GPS signal. Alternatively, the trajectory data of the GPS satellite may be acquired from an external server via the communication antenna 825.

(Communication Antenna 825)

The communication antenna 825 is an antenna that has a function of receiving a communication signal via, for example, a portable communication network or a wireless local area network (LAN) communication network. The communication antenna 825 can supply the received signal to the communication processing unit 827.

(Communication Processing Unit 827)

The communication processing unit 827 has a function of performing various kinds of signal processing on the signal supplied from the communication antenna 825. The communication processing unit 827 can supply a digital signal generated from the supplied analog signal to the CPU 839.

(Geomagnetic Sensor 829)

The geomagnetic sensor 829 is a sensor that detects geomagnetism as a voltage value. The geomagnetic sensor

829 may be a triaxial geomagnetic sensor that detects each of the geomagnetisms in the X, Y, and Z axis directions. The geomagnetic sensor 829 can supply the detected geomagnetism data to the CPU 839.

(Acceleration Sensor 831)

The acceleration sensor 831 is a sensor that detects acceleration as a voltage value. The acceleration sensor 831 may be a triaxial acceleration sensor that detects each of the accelerations in the X, Y, and Z axis directions. The acceleration sensor 831 can supply the detected acceleration data to the CPU 839.

(Gyro Sensor 833)

The gyro sensor 833 may be a kind of a measuring device that detects an angle or an angular velocity of an object. The gyro sensor 833 may be a triaxial gyro sensor that detects a change angle (angular velocity) of a rotation angle around the X, Y, and Z axes as a voltage value. The gyro sensor 833 can supply the detected angular velocity data to the CPU 839.

(Atmospheric Pressure Sensor 835)

The atmospheric pressure sensor 835 is a sensor that detects a surrounding pressure as a voltage value. The atmospheric pressure sensor 835 can detect a pressure as a predetermined sampling frequency and supply the detected pressure data to the CPU 839.

(Imaging Unit 837)

The imaging unit 837 has a function of photographing a still image or a moving image through a lens under the control of the CPU 839. The imaging unit 837 may store the photographed image in the storage unit 859.

(CPU 839)

The CPU 839 functions as an arithmetic device and a control device to control all of the processes in the information processing apparatus 100 in accordance with various kinds of programs. The CPU 839 may be a microprocessor. The CPU 839 can realize various functions in accordance with various kinds of programs.

(ROM 841 and RAM 843)

The ROM 841 can store programs, calculation parameters, or the like used by the CPU 839. The RAM 843 can temporarily store programs used in execution of the CPU 839, or parameters or the like appropriately changed in the execution.

(Operation Unit 847)

The operation unit 847 has a function of generating an input signal used for a user to perform a desired operation. The operation unit 847 may include an input unit, such as a touch sensor, a mouse, a keyboard, a button, a microphone, a switch, or a lever, with which that a user inputs information and an input control circuit configured to generate an input signal based on the input of the user and output the input signal to the CPU 839.

(Display Unit 849)

The display unit 849 is an example of an output device and may be a display device such as a liquid crystal display (LCD) device or an organic light emitting diode (OLED) display device. The display unit 849 can supply information by displaying a screen for a user.

(Decoder 851 and Speaker 853)

The decoder 851 has a function of performing decoding, analog conversion, or the like on input data under the control of the CPU 839. The decoder 851 performs the decoding, the analog conversion, and the like on audio data input via, for example, the communication antenna 825 and the communication processing unit 827 and outputs an audio signal to the speaker 853. The speaker 853 can output audio based on the audio signal supplied from the decoder 851.

(Encoder 855 and Microphone 857)

The encoder 855 has a function of performing digital conversion, encoding, or the like on input data under the control of the CPU 839. The encoder 855 can perform the digital conversion, the encoding, and the like on an audio signal input from the microphone 857 and output the audio data. The microphone 857 can collect audio and output the audio as an audio signal.

(Storage Unit 859)

The storage unit 859 is a data storage device and may include a storage medium, a recording device that records data in a storage medium, a reading device that reads data from a storage medium, and a deleting device that deletes data recorded in a storage medium. Here, for example, a non-volatile memory such as a flash memory, a magnetoresistive random access memory (MRAM), a ferroelectric random access memory (FeRAM), a phase change random access memory (PRAM), or an electronically erasable and programmable read-only memory (EEPROM), or a magnetic recording medium such as a hard disk drive (HDD) may be used as the storage medium.

The preferred embodiments of the present disclosure have hitherto been described in detail with reference to the accompanying drawings, but the technical scope of the present disclosure is not limited thereto. It is apparent to those skilled in the art of the present disclosure that the present disclosure is modified or amended in various forms within the scope of the technical spirit described in claims, and the modifications and amendments are, of course, construed to pertain to the technical scope of the present disclosure.

For example, in the above-described embodiments, a user first selects a target object with the finger F1, and then performs an operation on a display screen with the finger F2, but the present technology is not limited thereto. For example, a user may touch a blank portion (a portion in which an object is not displayed) on the display screen with the finger F2, and then may select a target object with the finger F1.

The configurations described below also pertain to the technical scope of the present disclosure.

(1) An information processing apparatus comprising: a display controller that controls a user interface to display a first object; and a detection unit that detects an input received at the user interface, wherein the display controller performs a predetermined operation corresponding to the displayed first object based on a relative relation of a first input detected at a first position at which the first object is displayed and a second input detected at a second position in which the first object is not displayed.

(2) The information processing apparatus of (1), further comprising: the user interface that is controlled by the display controller to display an object.

(3) The information processing apparatus of (1) to (2), wherein the information processing apparatus is one of a portable telephone, a personal computer, a video processing apparatus, a game console, a home appliance and a music reproducing apparatus.

(4) The information processing apparatus of (1) to (3), wherein the detection unit is a touch sensor disposed on a surface of the user interface that detects a touch input received at the user interface.

(5) The information processing apparatus of (1) to (4), wherein the display controller controls the user interface to display a plurality of objects including the first object.

(6) The information processing apparatus (5), wherein the display controller controls the user interface to display the first object differently from the other plurality of objects based on the detected first input.

(7) The information processing apparatus of (1) to (6), wherein the predetermined operation is an operation of changing a size of the displayed first object.

(8) The information processing apparatus of (7), wherein the detection unit detects a change in position of the second input and the display controller controls the user interface to change the size of the displayed first object based on the detected change in position.

(9) The information processing apparatus of (7) and (8), wherein the detection unit detects a change in position of the second input from the second position to a third position that is a greater distance from the first position than the second position, and the display controller controls the user interface to increase the size of the displayed first object based on the detected change in position.

(10) The information processing apparatus of (9), wherein the display controller controls the user interface to increase the size of the displayed first object in a direction corresponding to the detected change in position.

(11) The information processing apparatus of (9) and (10), wherein the display controller controls the user interface to display additional functions corresponding to the first object when the size of the displayed first object exceeds a predetermined size.

(12) The information processing apparatus of (7) to (11), wherein the detection unit detects a change in position of the second input from the second position to a third position that is a shorter distance from the first position than the second position, and the display controller controls the user interface to decrease the size of the displayed first object based on the detected change in position.

(13) The information processing apparatus of (12), wherein the display controller controls the user interface to decrease the size of the displayed first objection in a direction corresponding to the detected change in position.

(14) The information processing apparatus of (5) to (13), wherein the detection unit detects a plurality of individual inputs as the second input, and the display controller controls the user interface to display the first object and a sub-set of the plurality of objects differently from the remaining plurality of objects based on the plurality of individual inputs.

(15) The information processing apparatus of (14), wherein the detection unit detects a change in position of the second input from the second position to a third position that is a greater distance from the first position than the second position, and the display controller controls the user interface to increase the size of the displayed first object and the sub-set of the plurality of objects based on the detected change in position.

(16) The information processing apparatus of (1) to (15), wherein the detection unit detects, as the second input, a plurality of individual inputs, and the display controller controls the user interface to display a predetermined effect on the first object based on the plurality of individual inputs.

(17) The information processing apparatus of (1) to (16), wherein the predetermined operation is an operation of rotating the displayed first object.

(18) The information processing apparatus of (17), wherein the detection unit detects a change in position of the second input and the display controller controls the user interface to rotate the displayed first object in a direction corresponding to the detected change in position.

(19) An information processing method performed by an information processing apparatus, the method comprising: controlling a user interface to display a first object; detecting an input received at the user interface; and performing a predetermined operation corresponding to the displayed first object based on a first input detected at a first position at which the first object is displayed and a second input detected at a second position in which the object is not displayed.

(20) A non-transitory computer-readable medium including computer program instructions, which when executed by an information processing apparatus, cause the information processing apparatus to perform a method comprising: controlling a user interface to display a first object; detecting an input received at the user interface; and performing a predetermined operation corresponding to the displayed first object based on a first input detected at a first position at which the first object is displayed and a second input detected at a second position in which the object is not displayed.

REFERENCE SIGNS LIST

100 Information processing apparatus
101 Display unit
103 Detecting unit
104 Detection information acquiring unit
105 Operation recognizing unit
107 Display control unit

The invention claimed is:
1. An information processing apparatus comprising:
circuitry configured to
control a user interface to display a plurality of objects including a first object;
detect a first input and a second input received at the user interface, wherein the first input is detected at a first position at which the first object is displayed and the second input is detected at a second position in which the first object is not displayed;
determine whether a third input and at least one subsequent input that is performed discretely from the third input are received at the user interface and if so, a number of times the third input and the at least one subsequent input are received; and
perform a predetermined operation corresponding to the displayed first object based on a relative relation of the first input and the second input and on whether the third input and the at least one subsequent input are received and the number of times the third input and the at least one subsequent input are received, irrespective of a location at which the third input and the at least one substantive input are received, the predetermined operation comprising a change in an overlap state among the plurality of objects,
wherein the third input and the at least one subsequent input are performed discretely from one another, and wherein each of the third input and the at least one subsequent input is a tap input received at a single one of said locations on the user interface.

2. The information processing apparatus of claim 1, further comprising:
the user interface.

3. The information processing apparatus of claim 1, wherein
the information processing apparatus is one of a portable telephone, a personal computer, a video processing apparatus, a game console, a home appliance and a music reproducing apparatus.

4. The information processing apparatus of claim 1, further comprising:
a touch sensor disposed on a surface of the user interface that detects a touch input received at the user interface.

5. The information processing apparatus of claim 1, wherein
the circuitry is configured to control the user interface to display the first object differently from the other plurality of objects based on the detected first input.

6. The information processing apparatus of claim 1, wherein
the predetermined operation further comprises an operation of changing a size of the displayed first object.

7. The information processing apparatus of claim 6, wherein
the circuitry is configured to detect a change in position of the second input and to control the user interface to change the size of the displayed first object based on the detected change in position.

8. The information processing apparatus of claim 6, wherein
the circuitry is configured to detect a change in position of the second input from the second position to a third position that is a greater distance from the first position than the second position and to control the user interface to increase the size of the displayed first object based on the detected change in position.

9. The information processing apparatus of claim 8, wherein
the circuitry is configured to control the user interface to increase the size of the displayed first object in a direction corresponding to the detected change in position.

10. The information processing apparatus of claim 8, wherein
the circuitry is configured to control the user interface to display additional functions corresponding to the first object when the size of the displayed first object exceeds a predetermined size.

11. The information processing apparatus of claim 6, wherein
the circuitry is configured to detect a change in position of the second input from the second position to a third position that is a shorter distance from the first position than the second position and to control the user interface to decrease the size of the displayed first object based on the detected change in position.

12. The information processing apparatus of claim 11, wherein
the circuitry is configured to control the user interface to decrease the size of the displayed first objection in a direction corresponding to the detected change in position.

13. The information processing apparatus of claim 1, wherein
the circuitry is configured to detect a plurality of individual inputs as the second input and to control the user interface to display the first object and a sub-set of the plurality of objects differently from a remaining plurality of objects based on the plurality of individual inputs.

14. The information processing apparatus of claim 13, wherein
the circuitry is configured to detect a change in position of the second input from the second position to a third position that is a greater distance from the first position than the second position and to control the user interface to increase the size of the displayed first object and the sub-set of the plurality of objects based on the detected change in position.

15. The information processing apparatus of claim 1, wherein
the circuitry is configured to detect, as the second input, a plurality of individual inputs and to control the user interface to display a predetermined effect on the first object based on the plurality of individual inputs.

16. The information processing apparatus of claim 1, wherein
the predetermined operation further comprises an operation of rotating the displayed first object.

17. The information processing apparatus of claim 16, wherein
the circuitry is configured to detect a change in position of the second input and to control the user interface to rotate the displayed first object in a direction corresponding to the detected change in position.

18. An information processing method performed by an information processing apparatus, the method comprising:
controlling a user interface to display a plurality of objects including a first object;
detecting a first input and a second input received at the user interface, wherein the first input is detected at a first position at which the first object is displayed and the second input is detected at a second position in which the first object is not displayed;
determining whether a third input and at least one subsequent input that is performed discretely from the third input are received at the user interface and if so, a number of times the third input and the at least one subsequent input are received; and
performing a predetermined operation corresponding to the displayed first object based on a relative relation of the first input and the second input and on whether the third input and the at least one subsequent input are received and the number of times the third input and the at least one subsequent input are received, irrespective of a location at which the third input and the at least one substantive input are received, the predetermined operation comprising a change in an overlap state among the plurality of objects,
wherein the third input and the at least one subsequent input are performed discretely from one another, and wherein each of the third input and the at least one subsequent input is a tap input received at a single one of said locations on the user interface.

19. A non-transitory computer-readable medium including computer program instructions, which when executed by an information processing apparatus, cause the information processing apparatus to perform a method comprising:
controlling a user interface to display a plurality of objects including a first object;
detecting a first input and a second input received at the user interface, wherein the first input is detected at a first position at which the first object is displayed and the second input is detected at a second position in which the first object is not displayed;
determining whether a third input and at least one subsequent input that is performed discretely from the third input are received at the user interface and if so, a number of times the third input and the at least one subsequent input are received; and
performing a predetermined operation corresponding to the displayed first object based on a relative relation of the first input and the second input and on whether the third input and the at least one subsequent input are received and the number of times the third input and the at least one subsequent input are received, irrespective of a location at which the third input and the at least one substantive input are received, the predetermined operation comprising a change in an overlap state among the plurality of objects, wherein the third input and the at least one subsequent input are performed discretely from one another, and wherein each of the third input and the at least one subsequent input is a tap input received at a single one of said locations on the user interface.

\* \* \* \* \*